Feb. 18, 1947. H. W. SHONNARD 2,416,071
SPOTTING DEVICE FOR FREIGHT TRANSFER APPARATUS
Original Filed July 2, 1940
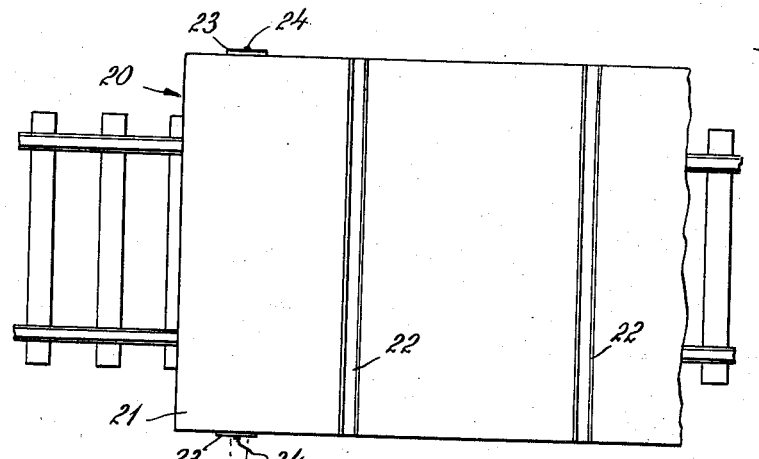
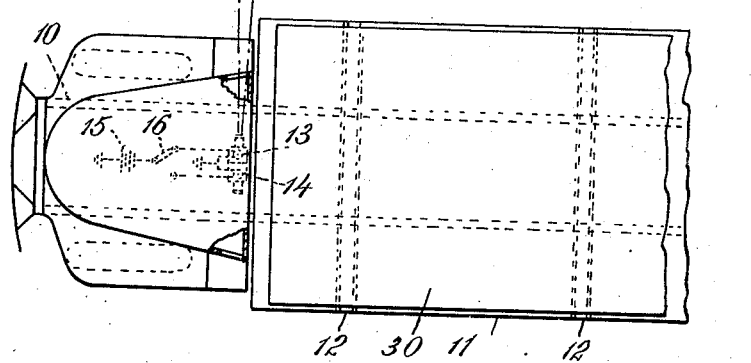
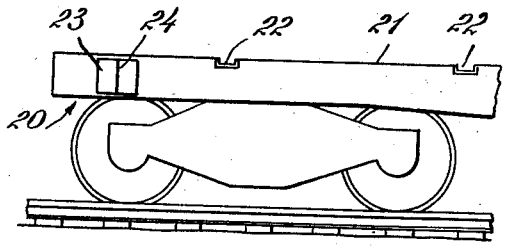
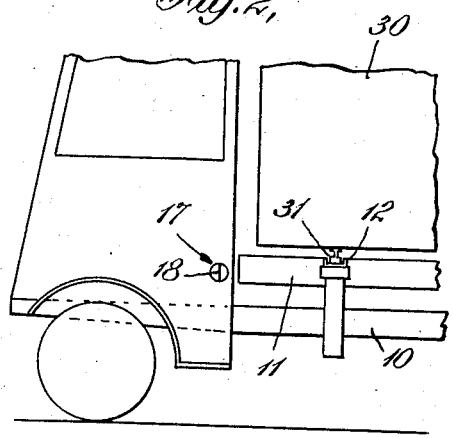
INVENTOR.
Harold W. Shonnard
BY
E. W. Marshall
ATTORNEY Patented Feb. 18, 1947

2,416,071

UNITED STATES PATENT OFFICE 2,416,071

SPOTTING DEVICE FOR FREIGHT TRANSFER APPARATUS

Harold W. Shonnard, Montclair, N. J.; Clara E. Shonnard, executrix of said Harold W. Shonnard, deceased Original application July 2, 1940, Serial No. 434,527. Divided and this application November 6, 1942, Serial No. 464,757

3 Claims. (Cl. 33—46)

This invention relates to a spotting device for freight transfer apparatus. Vehicles are in use which are arranged to transfer loads laterally from one to another or to or from platforms. The loads are frequently large containers for holding less than car load lots of freight. Such containers are provided usually with skids or with rollers which run in channels on the vehicles or platforms. Such channels are similarly spaced and the channels on a road vehicle, railroad car or platform which is to discharge or receive a container must be in alinement with those on an adjacent vehicle, car or platform which is to receive or discharge the container. Heretofore such alinement has been difficult and has required more than one operator.

It is the object of this invention to provide means for determining the correct alinement between two cooperating vehicles or a vehicle and a platform preparatory to transferring a load from one to the other. More specifically, its object is to provide a simple visual device by means of which the driver of a highway truck, for example, may readily position his vehicle alongside of another vehicle or platform with the channels of each in alinement.

I will describe the invention in the following specification and point out its novel features in appended claims.

Referring to the drawing,

Fig. 1 is a plan view of parts of a highway vehicle or truck provided with a light projecting device and of a part of a railway car having a light target thereon arranged to facilitate positioning the truck longitudinally in relation to the car;

Fig. 2 is a side elevation of a part of the highway vehicle shown in Fig. 1;

Fig. 3 is a side elevation on an enlarged scale of a part of the light projector on the vehicle; and Fig. 4 is a side elevation of the railway car shown in Fig. 1. This figure shows the light target on the car.

In the drawing, 10 designates the chassis of a highway vehicle. 11 is a frame mounted on the chassis having thereon transverse channels or guides 12.

21 designates the platform of a railway car 20. Transverse channels or guides 22 which correspond with the channels 12 on the truck are provided on the platform 21.

30 is a container having skids 31 affixed to its lower surface. These skids are adapted to rest on and slide over the channels or guides 12 and 22. In the drawings the container is shown on the frame 11 of the vehicle.

In the forward part of the highway vehicle is a light projector which comprises two electric lamps 13, 14 with suitable reflectors and lens assemblies. 15 is a battery and 16 a switch for connecting either of the lamps in the battery circuit. This device is arranged to project narrow beams of light at right angles to the chassis 10. Each lens assembly is provided with a light arrester 17 (Fig. 3) which has an opaque vertical line 18 through its center. This line 18 produces a darkened line across the projected beam of light.

A light target 23 is on the railway car (Fig. 4) at substantially the same elevation as that of the light projector. 24 is a vertical line on the target 23 in fixed relation to the channels 22. By this arrangement the driver of the truck can move it until the darkened line in a projected beam of light registers with the target line 24 on the car when the channels 12 on the truck and the channels 22 on the car will be in desired alinement.

This application is a division of co-pending application Serial No. 343,527, filed July 2, 1940, allowed August 7, 1942.

I intend no limitations other than those imposed by the appended claims.

What I claim is:

1. A relatively stationary structure having a load transfer station and a target remotely spaced longitudinally therefrom, combined with a power driven movable carrier having a power control station from which said carrier may be moved into parallelism with an edge of said station and longitudinally in relation thereto, a load transfer station on the carrier remote from the power control station, and means on the carrier near the power control station spaced from the load transfer station on the carrier a distance the same as the distance of the target from the load transfer station on said structure, for projecting a beam of light transversely onto said target when said carrier is parallel with an edge of the load-transferring station on the relatively stationary structure, and the load-transferring stations are in mutual alignment, without the aid of sighting stations.

2. Indicating means for facilitating the registration of correspondingly spaced parallel transverse load supporting guides on a pair of parallel platforms, at least one of the platforms being on a power driven movable vehicle, means near the operator's position on said power driven vehicle and remotely spaced longitudinally from the guides thereon for projecting a beam of light laterally from said vehicle, and a target on the second platform spaced the same distance from the guides thereon as the light projecting means is spaced from the guides on the power driven vehicle to indicate visually without the aid of sighting the guides, where the relative longitudinal positions of the platforms are such as to bring the respective transverse guides on the two platforms into mutual registration.

3. Indicating means for facilitating the registration of correspondingly spaced parallel transverse load supporting guides on a pair of parallel platforms, at least one of the platforms being on a power driven movable vehicle, means near the operator's position on said power driven vehicle and remotely spaced longitudinally from the guides thereon for projecting a beam of light laterally from the vehicle, means for arresting rays of light in said beam at the sides of a vertical line, a target on the second platform and a vertical line near the center of the target spaced the same distance from the guides on said second platform as the light projecting means is spaced from the guides on the power driven vehicle to indicate visually without the aid of sighting the guides where the relative longitudinal positions of the platforms are such as to bring the respective transverse guides on the two platforms into mutual registration.

HAROLD W. SHONNARD.

REFERENCES CITED

The following references are of record in the file of this patent:

UNITED STATES PATENTS

| Number | Name | Date |
|---|---|---|
| 2,252,807 | Haberle et al. | Aug. 19, 1941 |
| 2,127,480 | Fitch | Aug. 16, 1938 |
| 2,292,968 | Peters | Aug. 11, 1942 |
| 1,388,110 | Hallock | Aug. 16, 1921 |
| 1,820,828 | Powell | Aug. 25, 1931 |
| 2,285,723 | Kerrigan | June 9, 1942 |
| 1,922,791 | Bumpus | Aug. 15, 1933 |
| 1,801,469 | Wagner | Apr. 21, 1931 |
| 2,337,502 | Scott et al. | Dec. 21, 1943 |
| 2,342,828 | Armitage et al. | Feb. 29, 1944 |
| 679,567 | Lowe | July 30, 1901 |

FOREIGN PATENTS

| Number | Country | Date |
|---|---|---|
| 560,753 | German | Oct. 6, 1932 |